US009610879B2

(12) United States Patent
Zheng et al.

(10) Patent No.: US 9,610,879 B2
(45) Date of Patent: Apr. 4, 2017

(54) SEATBACK FOR A PASSENGER SEAT

(71) Applicants:SINGAPORE TECHNOLOGIES AEROSPACE LTD., Paya Lebar (SG); TENRYU HOLDINGS CO., LTD., Gifu (JP)

(72) Inventors: Guo Ying Zheng, Paya Lebar (SG); Wee Hong Anna Tan, Paya Lebar (SG); Tomoyuki Yoshimura, Gifu (JP)

(73) Assignees: SINGPORE TECHNOLOGIES AEROSPACE LTD, Singapore (SG); TENRYU HOLDINGS CO., LTD. (JP)

( * ) Notice: Subject to any disclaimer, the term of this patent is extended or adjusted under 35 U.S.C. 154(b) by 0 days.

(21) Appl. No.: 14/902,236

(22) PCT Filed: Jun. 20, 2014

(86) PCT No.: PCT/SG2014/000295
§ 371 (c)(1),
(2) Date: Dec. 30, 2015

(87) PCT Pub. No.: WO2015/002609
PCT Pub. Date: Jan. 8, 2015

(65) Prior Publication Data
US 2016/0152169 A1    Jun. 2, 2016

(30) Foreign Application Priority Data
Jul. 4, 2013    (SG) .............................. 201305203-0

(51) Int. Cl.
*A47B 83/02*    (2006.01)
*B60N 3/00*    (2006.01)
(Continued)

(52) U.S. Cl.
CPC ............. *B60N 3/004* (2013.01); *B60N 3/102* (2013.01); *B60R 7/005* (2013.01); *B60R 11/00* (2013.01);
(Continued)

(58) Field of Classification Search
CPC ............ B64D 11/0636; B64D 11/0638; B64D 11/0015; B64D 11/00; B60N 3/004;
(Continued)

(56) References Cited

U.S. PATENT DOCUMENTS 3,632,161 A * 1/1972 Arfaras .................... A47C 7/70
297/145
3,773,381 A  11/1973 Brennan
(Continued)

FOREIGN PATENT DOCUMENTS

DE    4343242 A1    6/1995
JP    2008168884 A   7/2008

OTHER PUBLICATIONS

International Preliminary Report on Patentability (Chapter II) dated Jun. 1, 2015 issued in corresponding Application No. PCT/SG2014/000295.

*Primary Examiner* — Rodney B White
(74) *Attorney, Agent, or Firm* — Dilworth IP LLC

(57) ABSTRACT

A seatback for a passenger seat, a passenger seat, and a method of manufacturing a seatback for a passenger seat. The seatback comprises an upwardly extending base having a front and a rear, the front capable of supporting a passenger; a pocket attached to the rear; a tray table attached to the rear and operable between a stowage position and a use position; and wherein the rear has a longitudinal length and a transverse width, with the tray table, when in the stowage position, being at least partly transversely aligned with pocket.

14 Claims, 10 Drawing Sheets

(51) Int. Cl.
*B64D 11/06* (2006.01)
*B60N 3/10* (2006.01)
*B60R 7/00* (2006.01)
*B60R 11/00* (2006.01)
*B60R 11/02* (2006.01)
*B61D 33/00* (2006.01)
*B63B 29/04* (2006.01)
*B64D 11/00* (2006.01)

(52) U.S. Cl.
CPC .......... *B60R 11/02* (2013.01); *B61D 33/0007* (2013.01); *B63B 29/04* (2013.01); *B64D 11/0015* (2013.01); *B64D 11/0636* (2014.12); *B64D 11/0638* (2014.12); *B60R 2011/0015* (2013.01); *B63B 2029/043* (2013.01)

(58) Field of Classification Search
CPC ......... B60N 3/102; B60R 11/00; B60R 11/02; B63B 29/04; B61D 33/0007
USPC .................................. 297/146, 163, 188.04
See application file for complete search history.

(56) References Cited

U.S. PATENT DOCUMENTS

| | | | | |
|---|---|---|---|---|
| 4,159,071 A * | 6/1979 | Roca | ...................... | A47C 7/70 297/163 X |
| 4,944,552 A * | 7/1990 | Harris | ...................... | A47C 7/70 297/145 |
| 5,547,247 A * | 8/1996 | Dixon | ...................... | A47C 7/70 297/145 |
| 5,720,515 A * | 2/1998 | Haffner | ................... | G09F 21/04 297/163 |
| 5,876,092 A * | 3/1999 | An | .......................... | B60N 3/004 297/146 |
| 5,878,672 A | 3/1999 | Ostermann et al. | | |
| 6,454,349 B1 * | 9/2002 | Konya | ................... | B60N 3/004 297/146 X |
| 6,761,398 B2 * | 7/2004 | Bentley | ..................... | B60N 2/22 297/163 X |
| 7,004,430 B2 * | 2/2006 | Weekly | .................. | B60N 3/004 297/146 X |
| 7,104,599 B2 * | 9/2006 | Berger | ................... | B60N 3/004 297/163 X |
| 7,306,282 B2 * | 12/2007 | Salzer | ...................... | A47C 7/70 297/146 X |
| 7,506,923 B1 * | 3/2009 | Gauss | .................... | B60N 3/002 297/149 |
| 8,141,948 B2 * | 3/2012 | Cassellia | ................ | B60K 35/00 297/188.04 |
| 8,613,479 B2 * | 12/2013 | Schurg | ................. | B60N 2/4876 297/163 X |
| 8,702,163 B2 * | 4/2014 | Westerink | ............. | B60N 3/004 297/146 |
| 8,997,660 B2 * | 4/2015 | Satterfield | .............. | A47B 31/06 297/146 X |
| 2001/0024056 A1 * | 9/2001 | Romca | ..................... | B60N 3/08 297/188.04 X |
| 2003/0184957 A1 * | 10/2003 | Stahl | ...................... | B60N 3/004 361/679.1 |
| 2009/0174234 A1 * | 7/2009 | Vignal | ................... | B60N 3/002 297/163 |
| 2012/0139303 A1 * | 6/2012 | Westerink | .......... | B64D 11/0015 297/163 |
| 2012/0212012 A1 * | 8/2012 | Berger | ............... | B64D 11/0015 297/163 |
| 2014/0042781 A1 * | 2/2014 | Reeves | .................. | B60N 3/004 297/163 |
| 2014/0183910 A1 * | 7/2014 | Ulbrich-Gasparevic | ............ | B60N 3/004 297/135 |
| 2014/0241650 A1 * | 8/2014 | Khankal | ................ | F16C 29/045 384/17 |
| 2015/0035325 A1 * | 2/2015 | Gagnier | .................. | B60R 7/043 297/188.04 |
| 2015/0061327 A1 * | 3/2015 | Millan | .................... | B60N 3/004 297/163 |

* cited by examiner

SEATBACK FOR A PASSENGER SEAT

FIELD OF INVENTION

The present invention relates broadly to passenger seats of an aircraft, train, vessel or vehicle, and more particularly, but not exclusively to a seatback of such a passenger seat.

BACKGROUND

Legroom refers to available space to an aft seated passenger, which is commonly considered as a critical indicator of a passenger's comfort, especially for long-haul flights (e.g. more than 6 hours). Seat pitch refers to the distance between a point on one seat to the same point on the seat immediately in front. Seat pitch, depth of seatback structure, cushion and the amenities installed on the seatback may determine the legroom available to an aft seated passenger.

FIG. 1 shows an image of a conventional airline seatback 100. Amenities that are commonly provided at the seatback 100 for the passenger's use during a long-haul flight may include In-Flight Entertainment (IFE) display 102, an IFE controller 104 at an upper portion of the seatback 100, a tray table 106 at adjacent middle portion of the seatback 100, a literature pocket 108, which holds e.g. safety information at a directly visible location for passengers when they are seated, at adjacent lower portion of the seatback 100, and other items such as a cup holder 110, and a coat hanger 112. These amenities often encroach on the space available to the aft seated passenger, thus reducing the passenger's legroom and potentially his comfort level.

FIG. 2 shows a schematic side view of two adjacent rows of conventional passenger seats illustrating legroom 202 between and a seat 204 and an aft seat 206, as well as seat pitch 208 between the seats 204, 206. Typically, the seat pitch 208 is kept as low as possible to maximize the number of rows of seats that may be installed. In this example, for a seat pitch of 81.3 cm (32 inches), the legroom 202, as defined by the distance between an edge 210 of the aft seat 206 to a literature pocket 212 at the seatback of the seat 204, is about 27.2 cm (10.7 inches). Such an amount of legroom may be rather limited, especially for tall passengers.

With reference to FIG. 1, the seatback tray table 106 is typically pivotally mounted such that it can be stowed against the seatback 100 and hinged down and away from the seatback 100 into a generally horizontal position for use by the passenger seated aft of the seat. Conventionally, the cup holder 110 is usually installed on the tray table 106, and the coat hanger 112 is traditionally integrated with the tray table latch with a small hook due to space constrain. With such arrangements, when the tray table 106 is stowed, the cup holder 110 becomes inaccessible. The small hook is limited in use due to its size and position. This may cause some inconvenience to passengers.

More recently, there are passenger seats that provide an independent cup holder 110 behind the tray table 106 (as shown in FIG. 1), and in this case the cup holder 110 will not be accessible while the tray table 106 is deployed. An independent coat hanger 112 may be provided at the side of seat to move away from the tray table 106. However, this may cause confusion between passengers as to the correct hanger corresponding to their respective seats.

A need therefore exists to provide devices and methods that seek to address at least one of the above problems, or to provide a useful alternative.

SUMMARY

According to a first aspect of the present invention, there is provided a seatback for a passenger seat, the seatback comprising:

an upwardly extending base having a front and a rear, the front capable of supporting a passenger;

a pocket attached to the rear;

a tray table attached to the rear and operable between a stowage position and a use position; and wherein the rear has a longitudinal length and a transverse width, with the tray table, when in the stowage position, being at least partly transversely aligned with pocket.

The tray table may comprise a first half and a second half movably coupled to the first half such that the second half may be substantially contiguous with the first half in the use position, and folded to the first half in the stowage position.

The second half may be coupled to the first half by hinge means.

The tray table may be pivotally attached to the base by first and second rotatable arms.

The first half may be connected to the first rotatable arm, and the second half may comprise a latch configured to engage with a support member connected to the second arm when the tray table is in the use position.

The tray table may be slidable at the same transverse level to or from the base when in the use position.

The seatback may further comprise at least one extendable rail connected to a respective one of the first half and second half for sliding the tray table to or from the base.

The pocket may comprise an outwardly facing surface configured to receive at least one of a cup holder and a coat hanger.

The cup holder and the coat hanger may be independently operable between a folded position in which the cup holder and the coat hanger may be flush with said surface, and a deployed position in which the cup holder and the coat hanger may extend away from said surface.

The pocket may comprise an outwardly facing surface configured to support an electronic device mounted thereto.

The pocket may be made of a rigid material.

According to second aspect of the present invention, there is provided a passenger seat comprising a seatback as defined in the first aspect.

According to a third aspect of the present invention, there is provided a method of manufacturing a seatback for a passenger seat, the method comprising the steps of:

forming an upwardly extending base having a front and a rear, the front being capable of supporting a passenger, and the rear having a longitudinal length and a transverse width;

attaching a pocket to the rear;

attaching a tray table to the rear, the tray table being operable between a stowage position and a use position, such that the tray table, when in the stowage position, is at least partly transversely aligned with pocket.

The method may further comprise attaching at least one of a cup holder and a coat hanger to an outwardly facing surface of the pocket.

Attaching at least one of a cup holder and a coat hanger to an outwardly facing surface of the pocket may comprise pivotally mounting each of said cup holder and said coat hanger to a complementary depression formed on said outwardly facing surface.

The method may further comprise mounting a support for an electronic device to an outwardly facing surface of the pocket.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 12 shows a sectional view of the coat hanger of FIG. 11.

FIG. 13 shows a sectional view of the cup holder of FIG. 11.

DETAILED DESCRIPTION

In an effort to create more legroom, embodiments of the present invention provide a seatback in which the tray table only occupies a portion of the width of the seatback. This is achieved e.g. with a table foldable along a latitudinal axis to fit into its new stowed position. With such tray table, the remaining width of the seatback may be used for the literature pocket so that the lower portion of the seatback is fully available as the passenger's legroom, as will be described in detail below.

Figure 1:
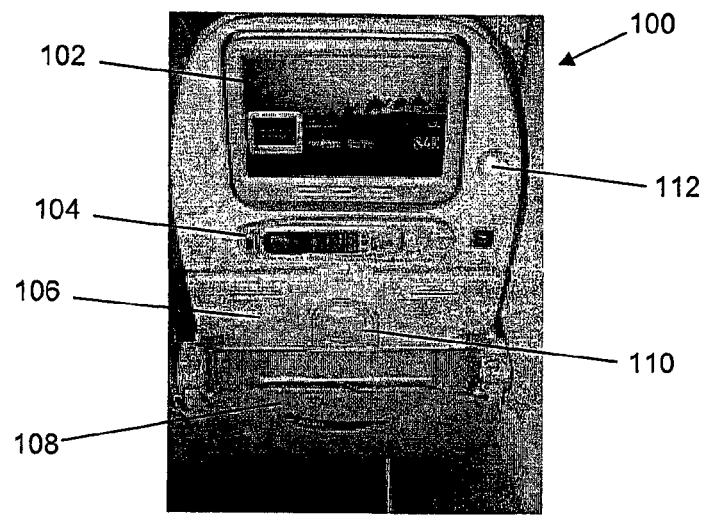
FIG. 1 shows an image of a conventional airline seatback.
Figure 2:
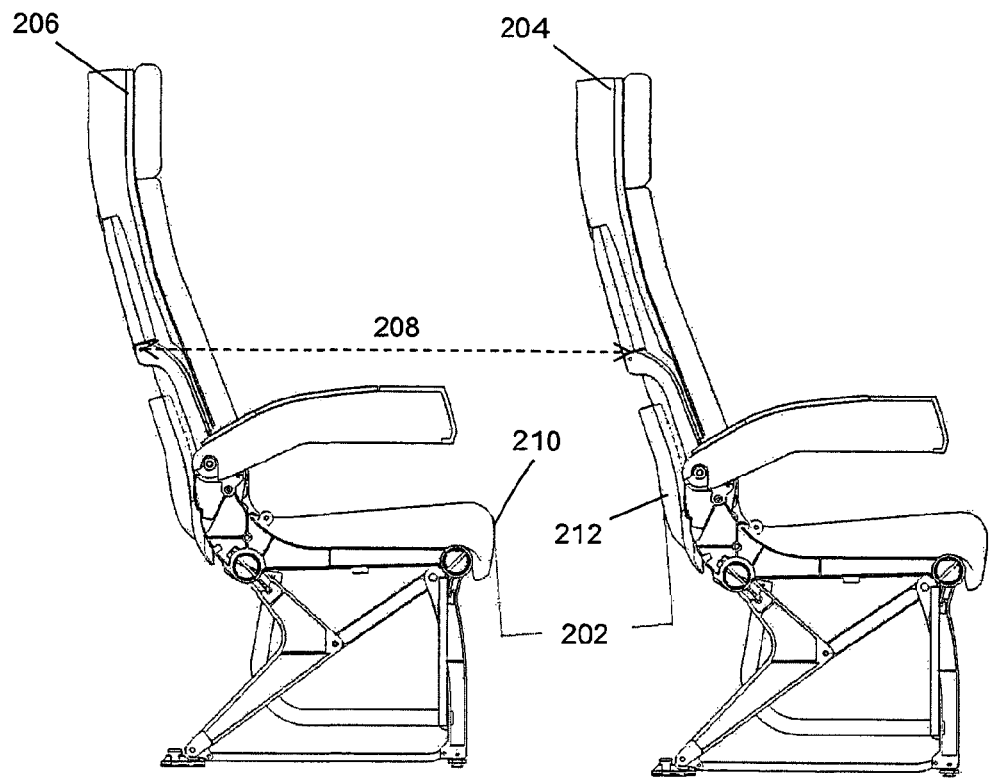
FIG. 2 shows a schematic side view of two adjacent rows of conventional passenger seats.
Figure 3:
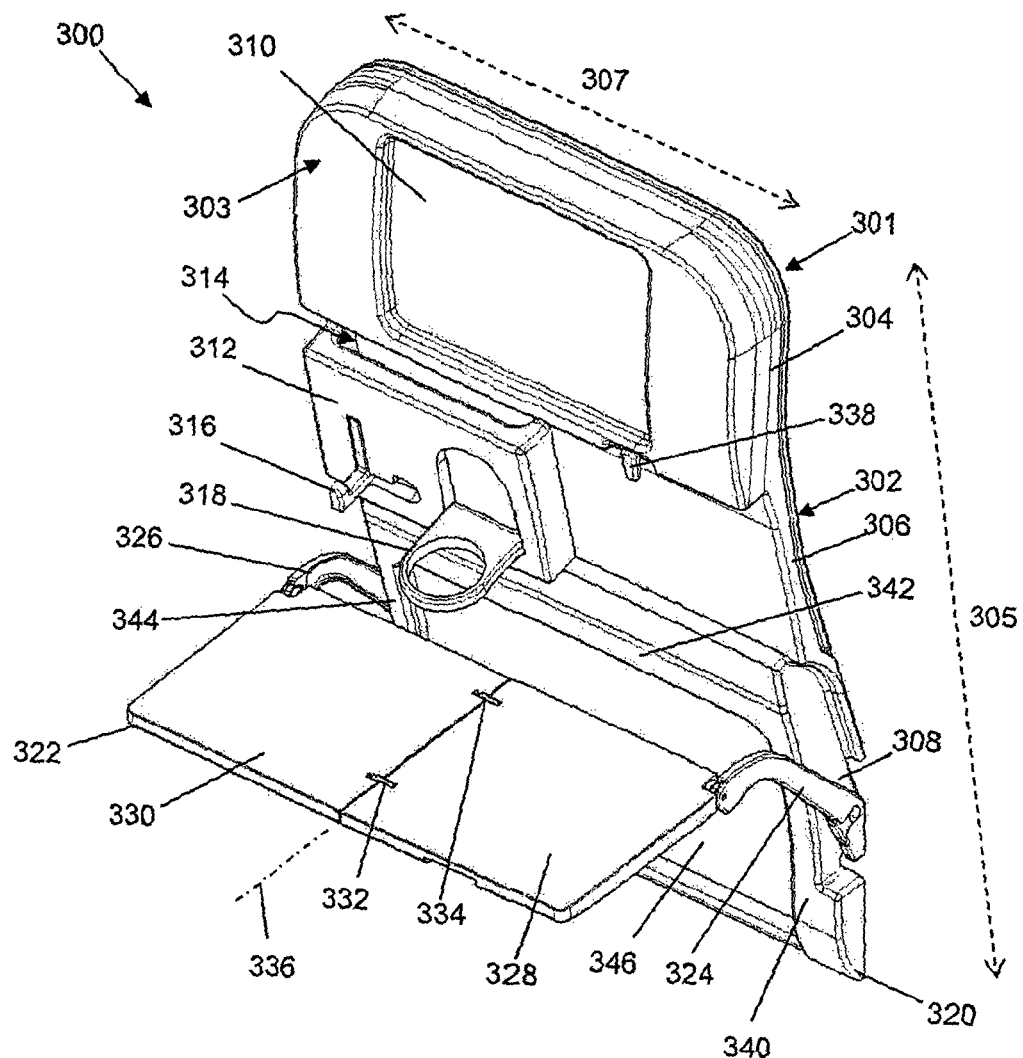
FIG. 3 shows a schematic perspective view of a seatback according to an example embodiment.
Figure 4:
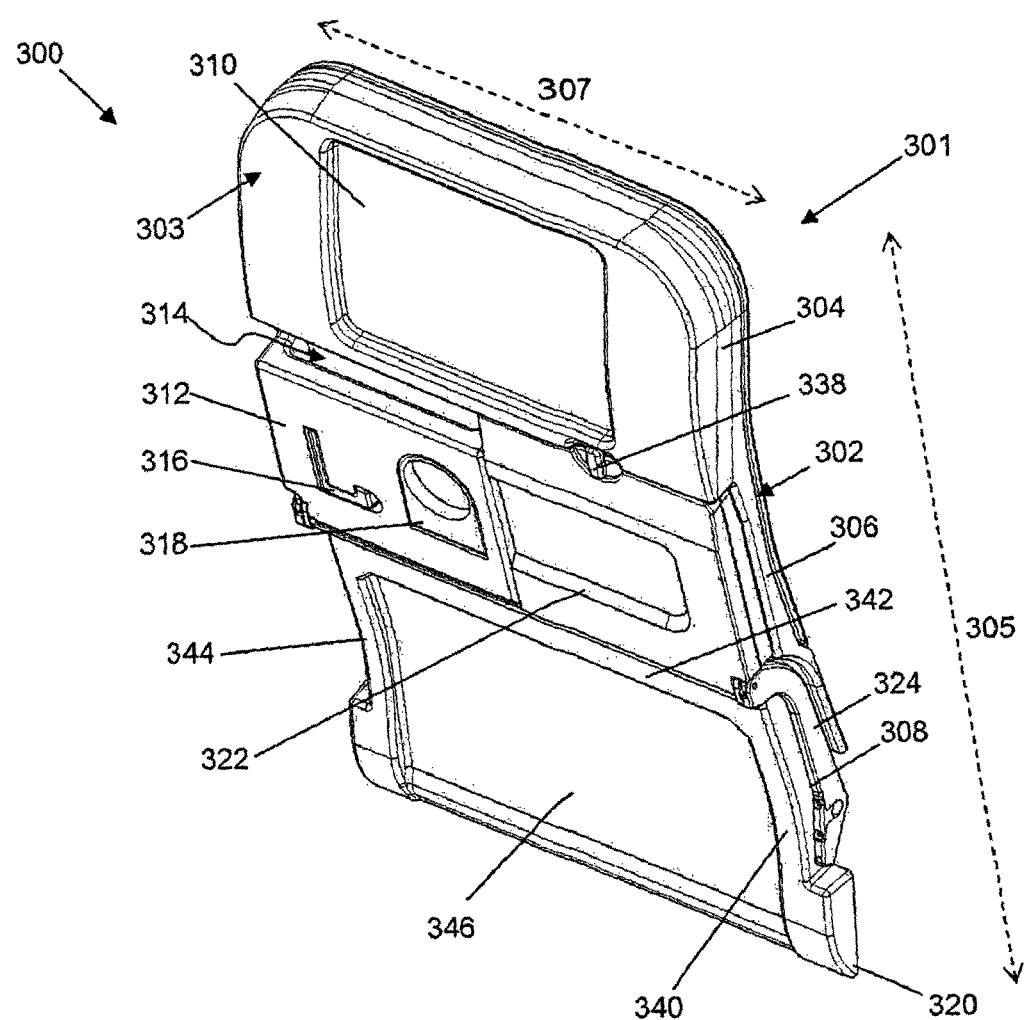
FIG. 4 shows an alternate schematic perspective view of the seatback of FIG. 3.

FIG. 3 shows a schematic perspective view of a seatback 300 according to an example embodiment. FIG. 4 shows an alternate schematic perspective view of the seatback 300 of FIG. 3.

The seatback 300 includes an upwardly extending base 302 which has a front 301 and a rear 303. The front 301 is capable of supporting a seated passenger. The rear 303 is made up of an upper portion 304, a middle portion 306 and a lower portion 308. In addition, the rear 303 has a longitudinal length 305 and a transverse width 307.

A display 310 for in-flight entertainment and information is typically mounted at the upper portion 304 of the rear 303. Attached to one side of the middle portion 306 (e.g. the left side) of the rear 303 is a pocket 312, which includes an opening 314 for receiving printed materials such as a safety instruction leaflet, an in-flight magazine, etc. or small items such as earphones, an eye mask, etc. The pocket 312 can support a coat hanger 316 and/or a cup holder 318, as will be described later. Typically, the base 302 of the seatback 300 is made of a rigid material so as to support a seated passenger. The front 301 may include a cushioning material to improve the comfort level of the passenger. Also, the base 302 may be rotatable by a predetermined amount about a bottom end 320 in a manner understood by a person skilled in the art, to allow the seated passenger to recline backward when desired.

A tray table 322 is attached to the rear 303 of the base 302 by rigid support arms 324, 326, which are rotatable relative to the base 302 to move the tray table 322 between a use position and a stowage position. In the use position, as shown in FIG. 3, the tray table 322 provides a substantially flat surface that can support a variety of items, e.g. a food and beverage tray, a laptop computer, a book, etc. (not shown). As also shown in FIG. 3, the tray table 322 includes a first half 328 and a second half 330 that forms a contiguous surface with the first half 328 in the use position. Here, the second half 330 is movably coupled to the first half 328 such that the second half 330 can be folded from the position shown in FIG. 3 by 180° clockwise toward the first half 328, e.g. before stowage. For example, the second half 330 is connected by to the first half 328 by hinges 332, 334 disposed along a center line 336 of the tray table 322. Alternatively, the second half of the table 330 may by 180° anticlockwise, toward the first half 328 before stowage using similar hinges. The literature pocket 312 may be attached to the right side of the middle portion 306 of the rear 303.

In the stowage position, as shown in FIG. 4, the second half 330 is folded to the first half 328, and disposed between the base 302 and the first half 328. The tray table 322 as a whole is secured to the base 302 adjacent the middle portion 306 by a retaining lever 338. In other words, the tray table 322 is at least partly transversely aligned with pocket 312. For example, the sizes of the tray table 322 and the pocket 312 are selected such that the tray table 312 occupies the remaining portion of the width of the rear 303 (e.g. the right half) not used by the pocket 312 when the tray table is in the stowage position. The positions of the tray table 322 and the pocket 312 in the transverse direction may be swapped as required, or desired.

As described, by re-arranging the position of the pocket 312 on the rear 303 of the base 302, the space adjacent the lower portion 308 of the rear 303 is freed up for the seated passenger's legroom. Moreover, the legroom can be enhanced by fabricating the lower portion 308 with thicker edges 340, 342, 344 and a recessed central area 346, as shown in FIGS. 3-4.

Figure 5:
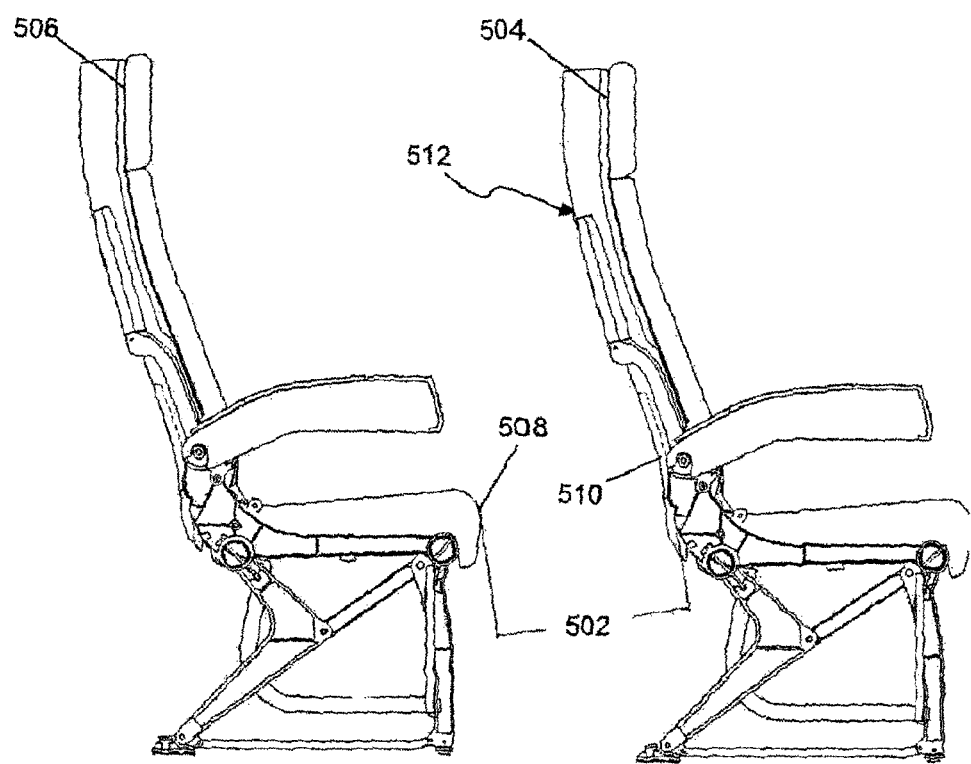
FIG. 5 shows a schematic side view of two adjacent rows of passenger seats incorporating the seatback of FIG. 3.

FIG. 5 shows a schematic side view of two adjacent rows of passenger seats illustrating legroom 502 between a seat 504 and an aft seat 506 both incorporating the seatback 300 of FIG. 3. For illustration purpose, using the same seat pitch of 81.3 cm (32 inches), the legroom 502, as defined by the distance between an edge 508 of the aft seat 506 to a lower portion 510 of a seatback 512 of the seat 504, is about 40 cm (12.2 inches), or an improvement of about 14% over the conventional passenger seats. This is based on the assumption that literature pocket has a thickness of 3.81 cm (1.5 inches).

An example implementation of the tray table 322 of FIG. 3 is now described with reference to FIGS. 6-10. Here, the like parts are denoted with like references, including those used in FIG. 3.

Figure 6:
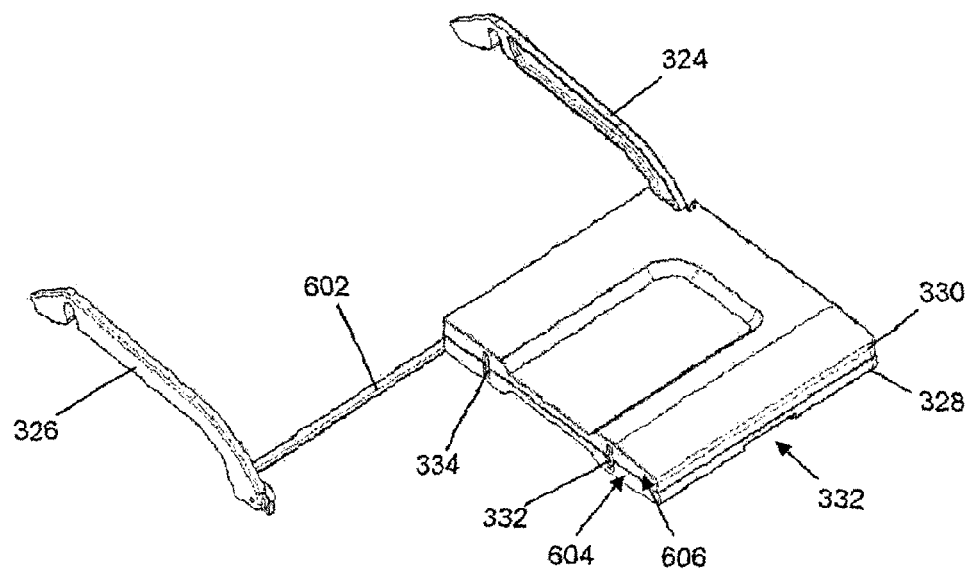
FIG. 6 shows a schematic perspective view of the tray table of FIG. 3 in a folded state.
Figure 7:
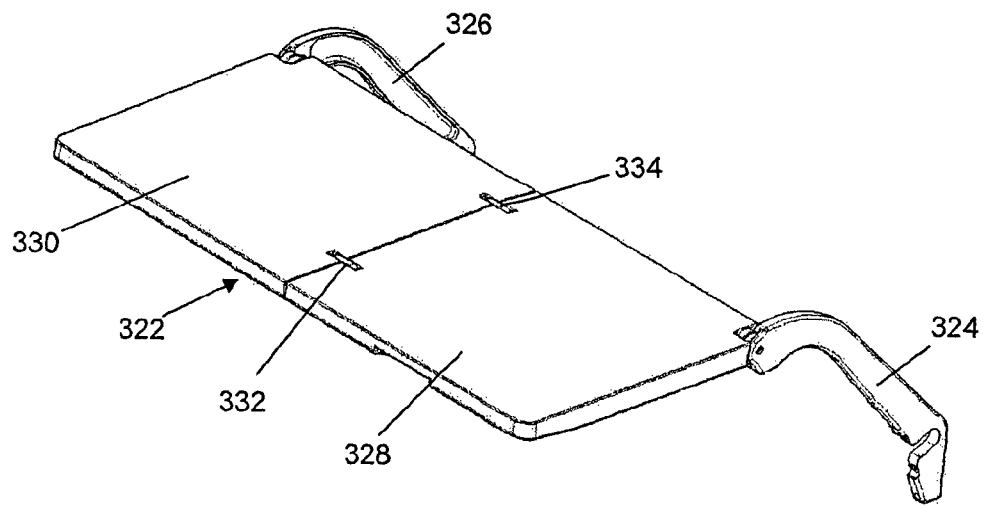
FIG. 7 shows a schematic perspective view of the tray table of FIG. 3 in an open state for use.

FIG. 6 shows a schematic perspective view of the tray table 322 in a folded state. FIG. 7 shows a schematic perspective view of the tray table 322 in an open state for use. A support bar 602 connects the arms 324, 326 and supports the tray table 322 in the position shown in FIG. 6. The hinges 332, 334 allows the second half 330 to be rotatable relative to the first half 328 between the folded state and open state. In the open state, side face 604 of the first half 328 abuts adjacent side face 606 of the second half 330, and limits the second half 330 from further rotation.

Figure 8:
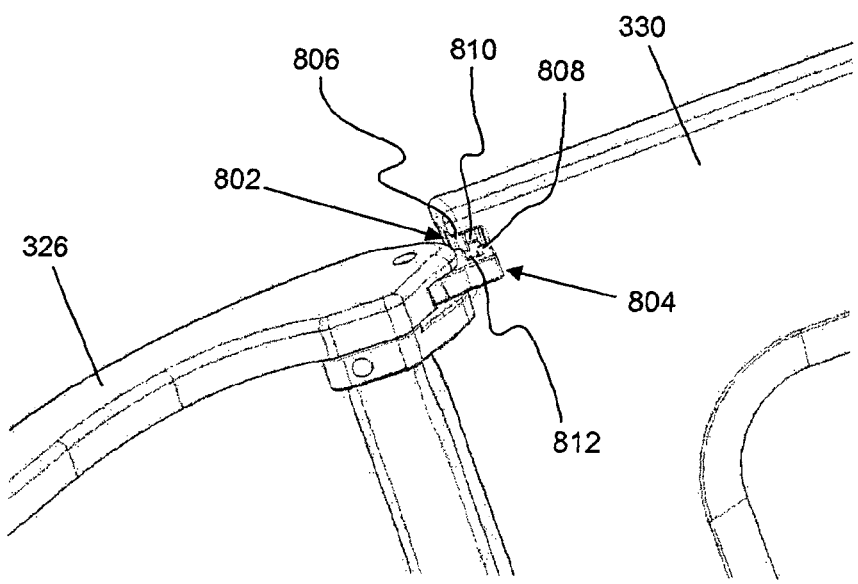
FIG. 8 shows a close-up view from below the tray table of FIG. 7.

In addition, as shown more clearly in FIG. 8 which provides a view from below the tray table 322, the second half 330 includes a latch 802 that can releasably engage with a corresponding support member, e.g. key 804, fixedly mounted to one end of the arm 326. For example the latch 802 and the key 804 have mating protrusions 806, 808 and recesses 810, 812 that allow the key 804 to receive the latch 802 when the second half 330 is turned flat open. The key 804 thus can help to secure the second half 330 in the open state and transfer the weight of the second half 330 and any item placed thereon to the arm 326. Other mechanisms secure and support the second half 330 in the use position may be used in alternate embodiments.

Figure 9:
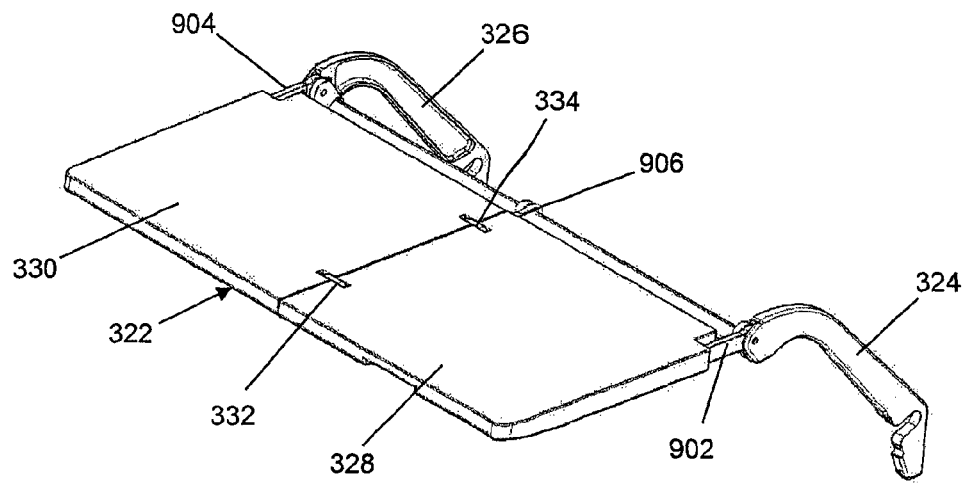
FIG. 9 shows the tray table of FIG. 7 in an extended position.
Figure 10:
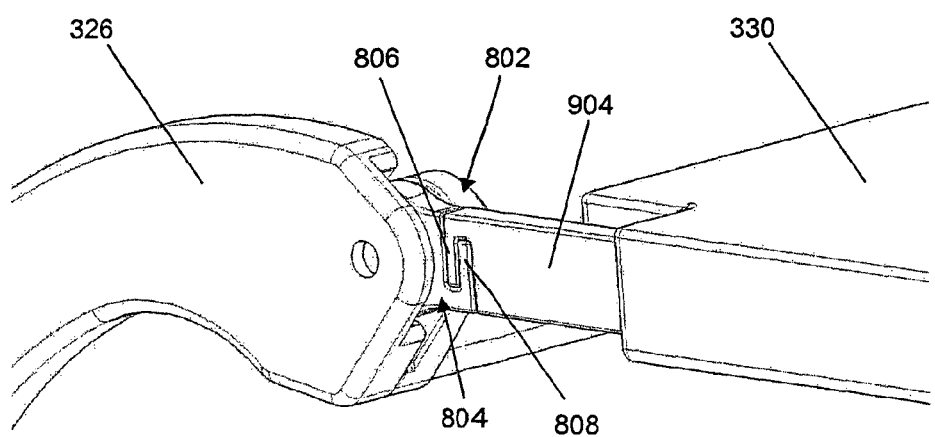
FIG. 10 shows a close-up view of a corner of the tray table in the position of FIG. 9.

In the use position, the tray table 322 is preferably slidable by a selected amount to or from the rear 303 of the base 302 (FIG. 3) while maintaining a substantially horizontal (i.e. transverse) level. FIG. 9 shows the tray table 322 in the use position in which the tray table 322 extends away from the arms 324, 326 (i.e. toward a seated passenger—not shown). For example, an extendable first rail 902 is pivotally mounted to the arm 324 at one end and received at the first half 328 at the other end to allow sliding movements by the first half 328. Also, as shown more clearly in FIG. 10 which provides a close-up view of a corner of the second half 330, the latch 802 is formed at an end of an extendable second rail 904 which allows sliding movements by the second half 330 to or from the arm 326. Here, the protrusion 808 on the key 804 interferes with the opposing protrusion 806 on the latch 802 and prevents dislodge when the tray table 322 is moved to or from the rear 303 of the base 302. The first rail 902 and second rail 904 can be, for example, rigid beams or tubes in telescopic engagement with elongated holes (not shown) formed on the first half 328 and second half 330 respectively In some embodiments, an additional extendable third rail 906 may be integrated at the end of first half 328 towards second half 330, as indicated in FIG. 9 (not shown in detail).

As described, the tray table 322 can provide similar functionality as conventional tray tables when in the use position, e.g. in terms of size, holding capacity, sliding movements, etc. while occupying a portion of the width of conventional tray tables when in the stowage position. In the example embodiment, such a configuration provides the space for attaching the pocket 312 (FIG. 3) to the middle portion 306 (FIG. 3) of the rear 303 of the base 302 (FIG. 3).

An example implementation of the pocket 312 is now described with reference to FIGS. 11-14. Here, the like parts are denoted with like references, including those used in FIG. 3.

Figure 11:
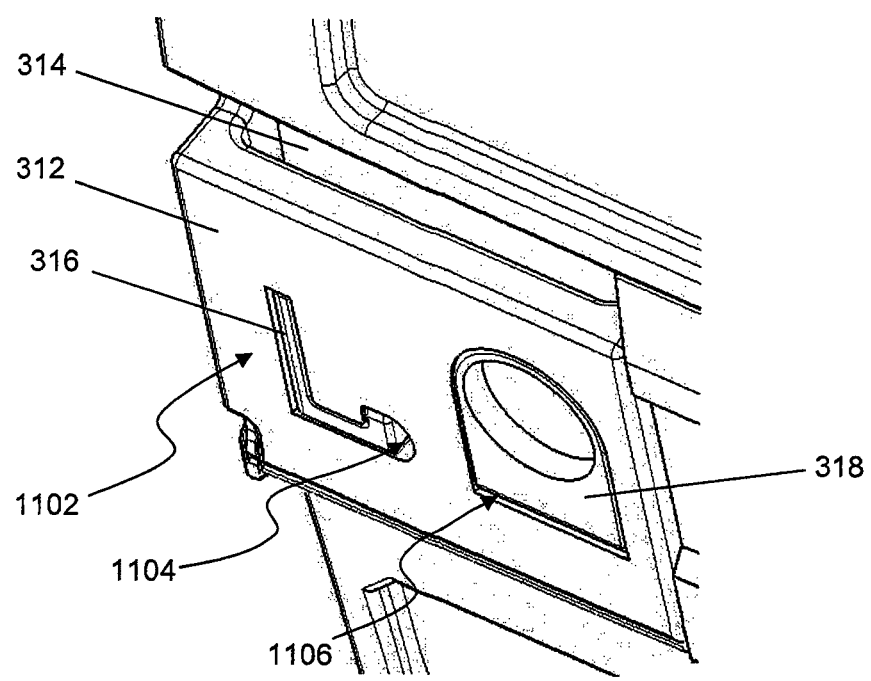
FIG. 11 shows a close-up view of pocket of FIG. 3 with the coat hanger and cup holder folded.

FIG. 11 shows a close-up view of the middle portion 306 of the rear 303 in FIG. 3 illustrating the pocket 312. Typically, the pocket 312 is made of a rigid material such as plastic to support the weight of items placed therein via the opening 314, as well as the weight of a coat and/or a beverage cup suspending therefrom. An outwardly facing surface 1102 of the pocket 312 includes recesses 1104, 1106 shaped to receive the coat hanger 316 and the cup holder 318 respectively. The depths and profiles of the recesses 1104, 1106 are selected such that in the position shown in FIG. 11 where the coat hanger 316 and the cup holder 318 are folded, the surface 1102 is substantially flush, i.e. no protrusion.

Figure 14:
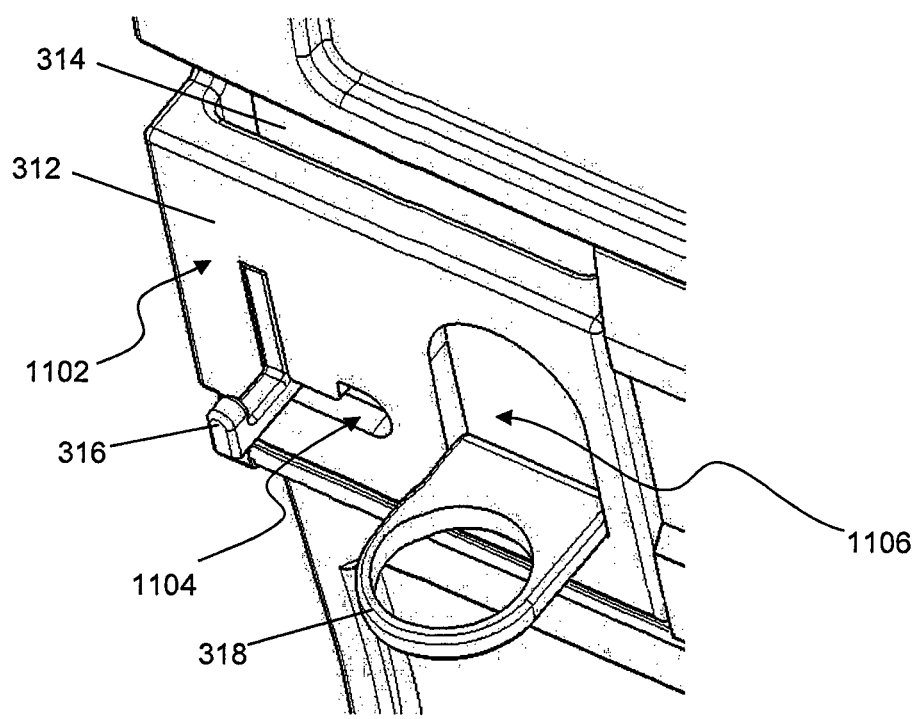
FIG. 14 shows the pocket of FIG. 11 with the coat hanger and cup holder extended.

Moreover, as shown in FIGS. 12 and 13 which provide sectional views of the coat hanger 316 and the cup holder 318 respectively, the coat hanger 316 and the cup holder 318 are pivotally mounted to the pocket 312 by respective pins 1108, 1110. The pins 1108, 1110 allow the coat hanger 316 and cup holder 318 to be swung from the folded position to the deployed position. FIG. 14 shows a close up view similar to that in FIG. 11, with the coat hanger 312 and cup holder 318 now extend away from the surface 1102 and are ready for use.

The arrangement as described above provides an independent coat hanger 316 that is also accessible and usable to the passenger all the time, and a cup holder 318 that is available all the time, especially during turbulence, irrespective of the tray table's positions. Preferably, the coat hanger 318 is positioned nearer to and edge of the seatback 302 so that a coat suspended therefrom does not interfere with the use of the tray table.

Figure 15:
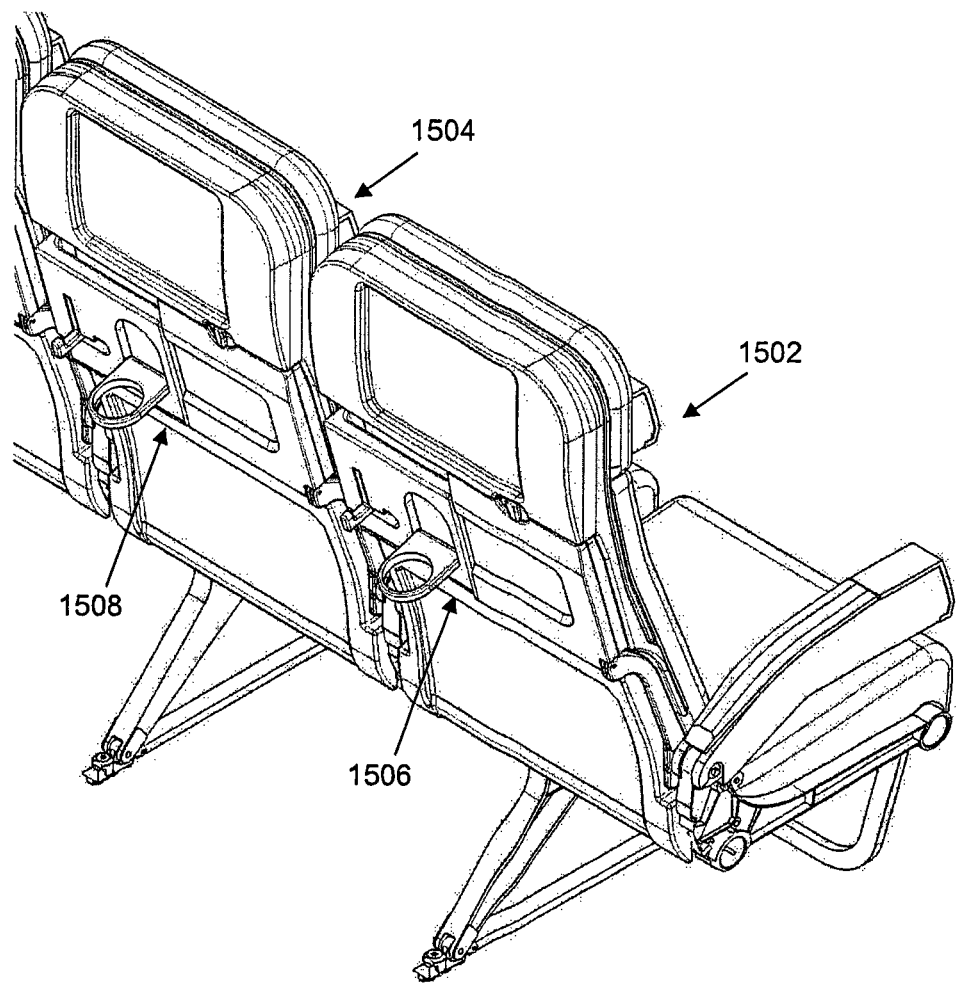
FIG. 15 shows a schematic perspective view of a row of passenger seats having the seatbacks of FIG. 3 according to an example embodiment.

FIG. 15 shows a schematic perspective view of a row of passenger seats 1502, 1504 each having the seatback of FIG. 3 according to an example embodiment. The seatbacks 1506, 1508 provide substantially the same amenities as existing seatbacks, while increasing the legroom available to passengers seated behind seats 1502, 1504. The seatbacks 1506, 1508 can be used to replace existing seatbacks to enhance passengers' comfort without compromising on the number of rows of seats.

Figure 16:
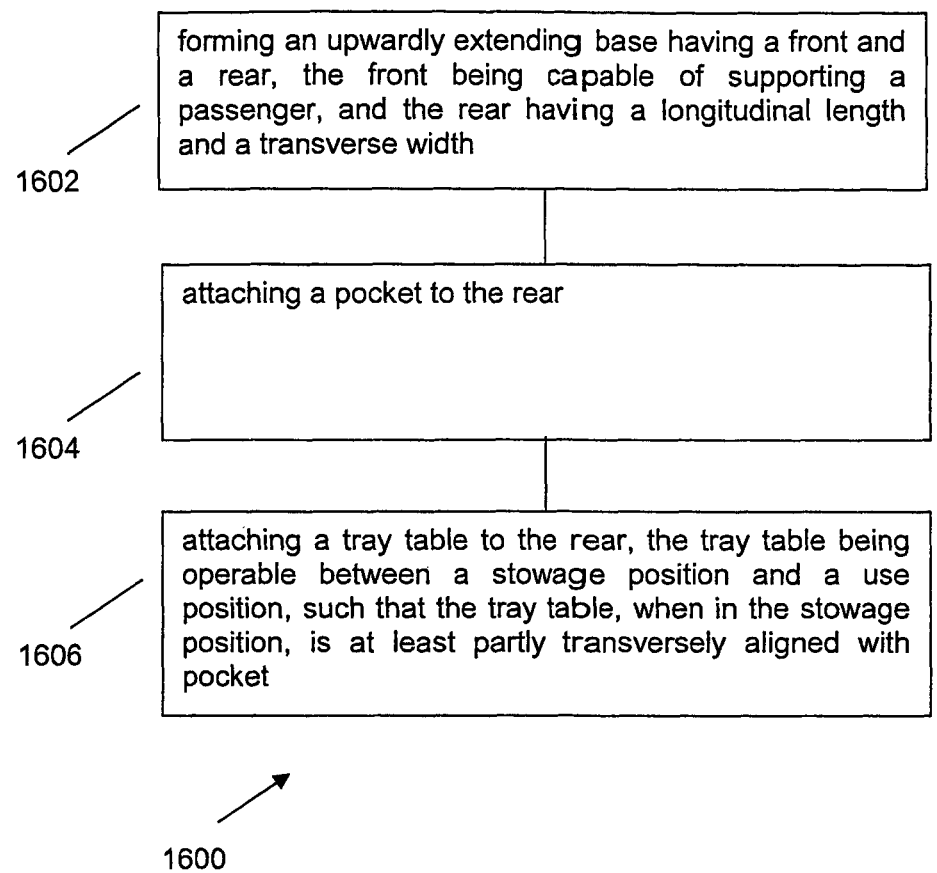
FIG. 16 shows a flow chart illustrating a method of manufacturing a seatback for a passenger seat according to an example embodiment.

FIG. 16 shows a flow chart 1600 illustrating a method of manufacturing a seatback for a passenger seat according to an example embodiment. At step 1602, an upwardly extending base having a front and a rear is formed. The front is capable of supporting a passenger, and the rear has a longitudinal length and a transverse width. At step 1604, a pocket is attached to the rear. At step 1606, a tray table is attached to the rear, the tray table being operable between a stowage position and a use position, such that the tray table, when in the stowage position, is at least partly transversely aligned with pocket.

It will be appreciated by a person skilled in the art that numerous variations and/or modifications may be made to the present invention as shown in the specific embodiments without departing from the spirit or scope of the invention as broadly described. For example, the pocket may occupy more than half of the width of the seatback, and the tray table may be made up of 3 folding sections joined by hinges, instead of 2 halves. The outwardly facing surface of the pocket can be used for other purposes other than receiving the cup holder and/or coat hanger, such as creating a holder or support for an electronic device like a tablet, an e-book reader, an I-Pad, etc., provided that items created onto this surface will not be interrupted with the use of the tray table. The present embodiments are, therefore, to be considered in all respects to be illustrative and not restrictive.

The invention claimed is:

1. A seatback for a passenger seat, the seatback comprising:
   an upwardly extending base having a front and a rear, the front capable of supporting a passenger; and
   a tray table attached to the rear and operable between a stowage position and a use position, wherein the tray table is pivotally attached to the base by first and second rotatable arms, comprises a first half and a second half movably coupled to the first half such that the second half is substantially contiguous with the first half in the use position, and folded to the first half in the stowage position, wherein the first half is connected to the first rotatable arm, and the second half comprises a latch configured to engage with a support member connected to the second arm when the tray table is in the use position;

wherein the rear has a longitudinal length and a transverse width, with the tray table, when in the stowage position, occupying a predetermined portion of the transverse width, and, when in the use position, extending rearwardly of the base and occupying substantially the whole transverse width.

2. The seatback as claimed in claim 1, further comprising a pocket attached to the rear, wherein the tray table, when in the stowage position, is transversely adjacent the pocket.

3. The seatback as claimed in claim 2, wherein the pocket comprises an outwardly facing surface configured to receive at least one of a cup holder and a coat hanger.

4. The seatback as claimed in claim 3, wherein the cup holder and the coat hanger are independently operable between a folded position in which the cup holder and the coat hanger are flush with said surface, and a deployed position in which the cup holder and the coat hanger extend away from said surface.

5. The seat back as claimed in claim 2, wherein the pocket comprises an outwardly facing surface configured to support an electronic device mounted thereto.

6. The seatback as claimed in claim 1, wherein the second half of the tray table is coupled to the first half of the tray table by hinge means.

7. The seatback as claimed in claim 1, wherein the tray table is slidable to or from the base when in the use position while maintaining a substantially horizontal level.

8. The seatback as claimed in claim 7, further comprising at least one extendable rail connected to a respective one of the first half and second half for sliding the tray table to or from the base.

9. A passenger seat comprising a seatback as claimed in claim 1.

10. A method of manufacturing a seatback for a passenger seat, the method comprising the steps of:

forming an upwardly extending base having a front and a rear, the front being capable of supporting a passenger, and the rear having a longitudinal length and a transverse width;

forming a tray table operable between a stowage position and a use position, wherein the tray comprises a first half and a second half, which second half comprises a latch configured to engage with a support member and is movably coupled to the first half such that the second half is substantially contiguous with the first half in the use position, and folded to the first half in the stowage position, such that the tray table, when in the stowage position, occupies a predetermined portion of the transverse width, and, when in the use position, extends rearwardly of the base and occupies substantially the whole transverse width; and attaching the tray table to the rear of the base by first and second rotatable arms, wherein the first half of the tray is connected to the first rotatable arm and the support member configured to engage with the latch of the second half of the tray when the tray table is in the use position is connected to the second arm.

11. The method as claimed in claim 10, further comprising attaching a pocket to the rear such that the tray table, when in the stowage position, is transversely adjacent the pocket.

12. The method as claimed in claim 11, further comprising attaching at least one of a cup holder and a coat hanger to an outwardly facing surface of the pocket.

13. The method as claimed in claim 12, wherein attaching at least one of a cup holder and a coat hanger to an outwardly facing surface of the pocket comprises pivotally mounting each of said cup holder and said coat hanger to a complementary depression formed on said outwardly facing surface.

14. The method as claimed in claim 11, further comprising attaching a support for an electronic device to an outwardly facing surface of the pocket.

* * * * *